United States Statutory Invention Registration [19]

[11] Reg. Number: H733

West [43] Published: Feb. 6, 1990

[54] EDUCATIONAL DEVICE FOR DEMONSTRATING NONSTANDARD COUNTING PROCEDURES

[75] Inventor: Jan C. West, Alliance, Ohio

[73] Assignee: The United States of America as represented by the President of the United States, Washington, D.C.

[21] Appl. No.: 211,981

[22] Filed: Jun. 3, 1988

[51] Int. Cl.[4] ..... G09B 19/02
[52] U.S. Cl. ..... 434/189
[58] Field of Search ..... 434/189, 199, 172

[56] References Cited

U.S. PATENT DOCUMENTS

| | | | |
|---|---|---|---|
| 973,905 | 10/1910 | Alexander | 434/199 |
| 1,013,856 | 1/1912 | Arnett | 434/172 |
| 3,670,958 | 6/1972 | Radosavljevic et al. | 434/189 X |

*Primary Examiner*—Deborah L. Kyle
*Assistant Examiner*—Michael J. Carone

[57] ABSTRACT

The invention is an educational device for explicitly demonstrating various operations with nonstandard counting procedures, mainly extending binary sequences by an additional digit for each sequence while remaining consistent with hereditary properties residing in the original or challenge sequence.

Illustrated in an inscribed sequence with sixteen binary digits and its derived sub-sequence with fifteen binary digits in a configuration for testing values of a variable denoted by the letter 'T.'The letter 'T' is inscribed upon a plate which indicates the exact position into which a new trial binary digit may be incorporated into the subsequence thereby extending the challenge binary sequence.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

EDUCATIONAL DEVICE FOR DEMONSTRATING NONSTANDARD COUNTING PROCEDURES

BACKGROUND FIELD OF INVENTION

Herein is described an invented device for the educational purpose of demonstrating various operations with nonstandard counting procedures, mainly extending binary and other types of sequences by an additional digit or symbol to remain consistent with hereditary properties residing in the original or challenge sequence.

My methods and embodiments for extending sequences with deep hereditary structure have evolved from studies with continuous systems and generalized for discrete behavior.

For particularized versions of the original conceptual experiments, see my "Application of a Block-Wiener Mapping to a Homeostatic Learning System," Journal of Cybernetics 1971, 1,3, pp64–78. For sequences with interesting hereditary properties, see Sir Karl Popper's book: *The Logic of Scientific Discovery,* wherein lie many examples.

DRAWINGS FIGURES

Two-piece Device—Description

Figure 1:
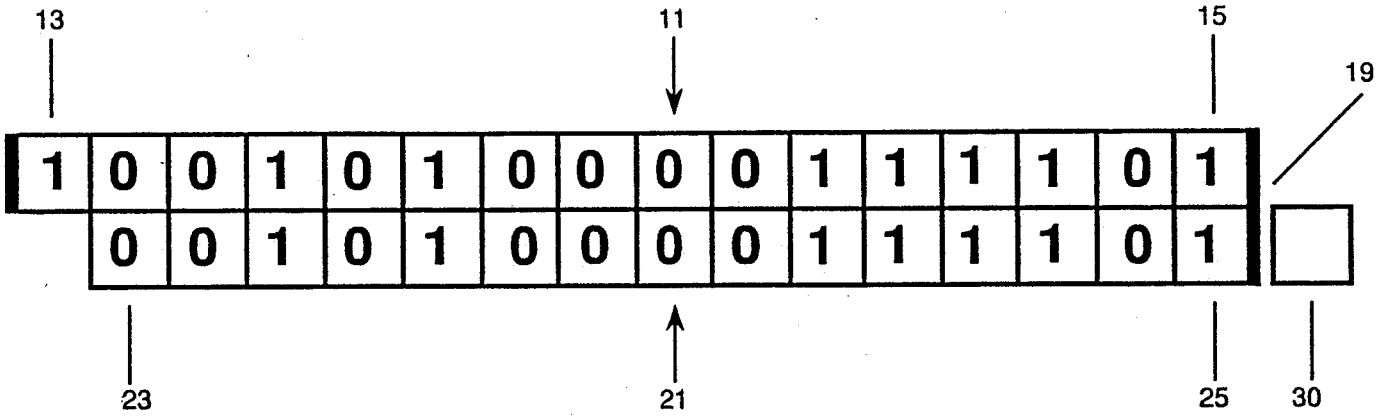
FIG. 1 shows an inscribed challenge binary sequence and challenge binary sub-sequence and configuration for commencing extension.

FIG. 1 shows a two-piece educational device according to the preferred embodiment of the invention, one piece being composed of four units bound into a single unit.

The device comprises in part a primary row of thin metal plates 11 soldered together into a unit. The primary row 11 of sixteen plates forms a primary challenge binary sequence of sixteen binary digits, ones and zeros, inscribed upon the plates, including the leftmost primary plate 13 of the primary binary challenge sequence containing the binary digit '1' and the right-most primary plate containing the binary digit '1'. The left-most plate 13 and the right -most plate 15 in the primary row of plates 11 and plates of the primary row 11 which lie intermediate to them form in precisely prescribed order reading conventionally from left to right the primary challenge binary sequence which is:

1001010000111101

An exposed portion of a primary platen 15 results when the primary row of plates 11 almost but not totally covers it, leaving a small margin on the right-hand side of said primary platen to the immediate right of the primary row of plates 11. The primary row of plates 11 is permanently affixed to the said primary platen.

The invented device comprises also a secondary row of thin metal plates 21 soldered together into a unit. The secondary row of plates 21 forms a secondary challenge binary subsequence of fifteen binary digits, ones and zeros, inscribed upon the plates, including the left-most secondary plate 23 of the secondary challenge binary sub-sequence containing the binary digit '0' and the right-most plate 25 of the secondary row of plates 21 inscribed with the binary digit '1'. From left to right the secondary challenge binary sequence reads as follows:

001010000111101

An exposed portion of a secondary platen 25 results when the secondary row of plates 21 does not totally cover it, leaving a small margin on the right-hand side of said secondary platen to the immediate right of the secondary row of plates 21. The secondary row of plates 21 is permanently affixed to the secondary platen as a unit.

The secondary platen with its affixed secondary row of plates 21 as a unit is in turn affixed to the primary platen as a unit with its affixed primary row of plates 11 as a unit. Thus the said primary platen with its attached primary row of plates 11 and the said secondary platen with its attached secondary row of plates 21 are affixed to each other into a single unit of the two-piece unit.

The primary platen and the secondary platen are aligned as shown in FIG. 1 with the righthand edge of the left-most plate 13 aligned collinearly with the left-most edge of the left-most plate 23 of the secondary row 21 of plates. Plate by plate the primary row 11 and the secondary row 21 are aligned with a single plate of the secondary row 21 of plates appearing to be missing to give a row of plates only fifteen in number. The locus for the missing plate is the space immediately left of the left-most plate that actually appears, namely plate 23, the left-most plate of the secondary row. The plate appearing to be missing is a copy of the left-most plate 13 of the primary row of plates 11, which has inscribed upon it the binary digit '1'. Each of the other plates of the primary challenge binary sequence has its exact counterpart in the plane of the paper of FIG. 1 with its duplicate plate enscribed with the same binary digit. To add a sixteenth digit and thereby increase the secondary challenge binary sub-sequence from fifteen to sixteen digits is equivalent to adding one more digit to the primary challenge enge binary digits, giving the primary challenge binary sequence a new digit for which it is a query of whether it may in fact be the same binary digit as the digit inscribed on the left-most plate 13 of the primary row of plates, exactly identical to the digit appearing to be missing from the secondary challenge binary sub-sequence on the left-most side, only to have been restored as the right-most digit inscribed on the right-most plate 25 of the secondary row of plates in this case.

The other piece of the two-piece device comprises a single thin metal blank metal plate 30, with no other inscription of any kind inscribed theron. As FIG. 1 shows, blank plate 30 is situated to the right at a short distance from the right-hand edge of the right-most plate 25 of the secondary row 21.

The said distance of separation of the blank plate 30 from the secondary row 21 of plates is equivalent to the width of the exposed portion 19 of the secondary platen.

Figure 2:
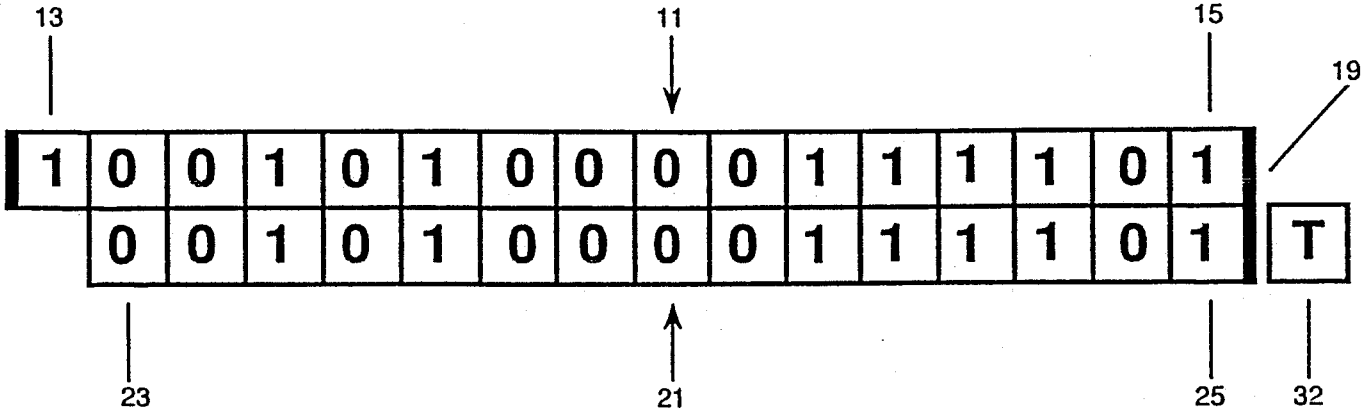
FIG. 2 shows advanced stage of determining a fit suitable for extension by using letter 'T' as a variable.

FIG. 1 and FIG. 2 differ only in the occurrence of the blank plate 30 in FIG. 1 and the occurrence of a plate 32 of FIG. 2, which is inscribed with a letter variable 'T' and situated exactly in the position described to be to the right of the secondary row 21 of metal plates.

Two-piece Device—Operation

A two-piece educational device shown in FIG. 1 will demonstrate the appropriate manner in which to extend correctly a challenge binary sequence by one more digit so as to be consistent with the hereditary properties residing in the said challenge sequence. Users will find the embodiment of the method of demonstration most useful where non-standard counting numbers are involved.

To demonstrate the extending of the challenge binary sequence:

1001010000111101 the user should refer to FIG. 1 and should use the blank plate 30 as an indicator of the exact position into which the new binary digit should be incorporated.

Specification of said exact positioning must be in relation to the primary platen exposed portion 19 on the right for the platen accommodates the primary row 11 of metal plates bearing the sixteen binary digits of the challenge binary sequence:

1001010000111101 and must also be in relation to the secondary platen exposed portion 29 on the right for the platen accommodates the secondary row 21 of plates bearing the fifteen binary digits of the challenge binary sub-sequence:

001010000111101

With the blank plate 30 positioned in the appropriate relationship as illustrated in FIG. 1, the plate 32 inscribed with the variable letter 'T' may now be substituted for blank plate 30. The plate 32 with 'T' for Trial, permits substitution and preliminary trial and testing, if necessary, with either a thin metal plate inscribed with a zero or inscribed with a one, using uniformly manufactured plates as heretofore employed in the device. In the same binary case as before the correct fit is found for the variable letter 'T' to have the value '1', and accordingly a plate so inscribed remaining in position with the platen 13 which is primary and with the platen 23 which is secondary permits no error or contradiction, thus consistency with respect to the hereditary properties both the challenge binary sequence and the challenge binary sub-sequence.

While the above description contains many specifications, these should not be in any way conceived as limitations on the scope of the invention but merely examples of a application and preferred embodiments which have an inner logic inherent to correctness of the procedures employed. Skilled artisans will see many possibilites in the richness of hereditary theory and nonstandard counting theory. Plates and platens may be made of many kinds of rigid or flexible imprintable materials which is of no consequence to the performance of correctly materializing an extension of hereditary properties. Also any set of whole numbers or of course also finite set of differentiated symbols will do to construct challenge sequences and their derived challenge subsequences. It is to be hoped that the reader will determine the scope of the invention by usages in the claims section and their legal equivalents and not by the examples and discussion given, alone.

I claim:

1. An educational device for extending sequences comprising;

a first platen accomodating a row of a plurality of first plates secured together and inscribed with a challenge numerical sequence;

a second platen accomodating a row of a plurality of second plates secured together and inscribed with a challenge numerical sub-sequence;

said first and second platens being secured together to function as a unit, with said second platen being offset to the right with respect to said first platen by one digit position of said sequence;

and a third plate positioned to the right of said second platen, said third plate serving as a means of preparing for the continuation of said challenge numerical sub-sequence.

2. The device of claim 1 wherein said numerical sequence and numerical sub-sequence are a binary sequence and a binary sub-sequence.

3. The device of claim 1 wherein said third plate is blank.

4. The device of claim 1 further comprising a fourth plate inscribed with letter T, said fourth plate being substituted for said third plate and serving as a means of testing for the continuation of said challenge binary sequence.

5. The device of claim 1 wherein the challenge sequence in an n-ary sequence for any n, whole number.

6. The device of claim 1, wherein the challenge sequence comprises any finite number of any differentiated symbols.

7. The device of claim 1 wherein said first and second platens and said first and second pluralities of plates are metal.

* * * * *